Patented Mar. 6, 1945

2,370,689

UNITED STATES PATENT OFFICE 2,370,689

TERPENE DERIVATIVES

Alfred L. Rummelsburg, Wilmington, Del., assignor to Hercules Powder Company, Wilmington, Del., a corporation of Delaware No Drawing. Application June 30, 1942,
Serial No. 449,171

17 Claims. (Cl. 260—23)

This invention relates to new compositions of matter and methods of producing the same; and in particular it relates to liquid resinous copolymers suitable for use in protective coatings.

In accordance with this invention, it has been found that an acyclic terpene having three double bonds per molecule or a mixture thereof with monocyclic and bicyclic terpenes may be copolymerized with an acyclic unsaturated monobasic fatty acid having between 12 and 22 carbon atoms or the mono and polyhydric alcohol esters thereof. The copolymerization reaction is desirably carried out in the presence of a suitable catalyst and under suitable operating conditions to yield a series of new liquid resins which have many interesting and useful properties. However, the use of a catalyst is not essential.

Accordingly, the resinous copolymers of this invention may be prepared by simply heating a mixture of an acyclic terpene and an acyclic unsaturated monobasic fatty acid of between 12 and 22 carbon atoms or its mono and polyhydric alcohol esters at an elevated temperature. The practical temperature limits for this heating step are between about 150° C. and 350° C. The copolymerization reaction will be speeded up considerably and higher yields of copolymerized resin are obtained in conjunction with the use of various polymerization or condensation catalysts such as the metal halide, the acid and the activated clay type catalysts. With the use of these catalysts various temperatures may be employed, different reaction periods, etc., as will be fully disclosed hereinafter. At the conclusion of the reaction period, the catalysts employed, if any, are removed by suitable methods. Thereafter, inert solvents and unreacted constituents are removed by well-known processes.

As illustrative of the invention, the following specific examples are given. It will be realized, however, that the invention in its true scope is not subject to the limitations in the examples, but actually is of a much broader scope which will become apparent upon a reading of the entire specification. All parts and percentages are by weight unless otherwise indicated.

Example 1

One hundred parts of linseed oil and 80 parts of 95% allo-ocimene were agitated at 180° C. with 40 parts of fuller's earth for a period of 7 hours under reflux in an atmosphere of $CO_2$. The allo-ocimene employed contained a very small amount of α-pinene and dipentene. The fuller's earth had a particle size of 80 mesh and had previously been calcined at 450° C. for 0.5 hour. At the end of the reaction period the catalyst was filtered from the hot mixture. Unreacted constituents were removed by vacuum distillation employing a final bath temperature of 190° C. and a pressure of 15 mm. One hundred and seventy parts of a copolymer resin resulted which was a viscous oil having an acid number of 9, a saponification number of 60 and a color of K on the rosin scale.

Example 2

Forty parts of linseed oil and 90 parts of myrcene were dissolved in 150 parts of toluene. A solution of 9 parts of anhydrous stannic chloride in 25 parts of toluene was added thereto while stirring vigorously at a temperature of 5 to 12° C. After standing for a period of 8 hours at 60° C., the reaction mixture was washed with 1000 parts of aqueous 15% sulfuric acid at 60° C., and then with water at 60° C. The toluene solution was then filtered through 15 parts of Filter-Cel (diatomaceous earth). The toluene was removed as in Example 1. Ninety parts of a copolymer resin resulted which was a viscous oil having an acid number of 6, a saponification number of 42 and a color of H on the rosin scale.

Example 3

A mixture of 200 parts of China-wood oil, 250 parts of 60% allo-ocimene and 100 parts of aqueous 85% orthophosphoric acid was agitated at 30° C. for 7 hours and for an additional one-half hour at 50° C. The allo-ocimene employed contained α-pinene, dipentene and a small amount of unidentified terpenes. The resulting viscous liquid was diluted with toluene and washed with water. The solvent and unreacted constituents were then removed by vacuum distillation using a final bath temperature of 195° C. and a pressure of 15 mm. to obtain 375 parts of a very viscous liquid resin. It had an acid number of 9 and a saponification number of 70.

Example 4

A mixture of 160 parts of 65% allo-ocimene and 160 parts of soya bean oil was refluxed at 200° C. for 25 hours. The allo-ocimene employed contained some α-pinene, dipentene and a small amount of unidentified terpenes. Unreacted constituents were removed by reduced pressure distillation using a final bath temperature of 175° C. and a pressure of 15 mm. Two hundred and one parts of a copolymer resin remained which was a viscous liquid. It had an acid number of 7, a saponification number of 144, and a color of I on the rosin scale.

Example 5

A mixture of 100 parts of China-wood oil fatty acids and 60 parts of 95% myrcene were dissolved in 250 parts of benzene. Eight parts of gaseous boron fluoride was absorbed in the solution at 5–15° C. with agitation during a period of 20 minutes. After standing for a period of 22 hours at 0–3° C., the reaction mixture was washed with water at 60° C. to remove the catalyst. The solvent was then removed by vacuum distillation employing a final bath temperature of 190° C. and a pressure of 15 mm. One hundred and forty-nine parts of a copolymer resin remained which was a viscous liquid. It had an acid number of 90 and a saponification number of 101.

Example 6

A mixture consisting of 200 parts of dehydrated castor oil and 150 parts of 100% allo-ocimene were heated at 300° C. for a period of 20 minutes with agitation in a stainless steel autoclave. The reaction mixture was rapidly cooled and subjected to a vacuum of 15 mm. pressure at a bath temperature of 175° C. to remove any unpolymerized allo-ocimene. Three hundred parts of a copolymer resin remained which was a viscous liquid. It had an acid number of 7, and a saponification number of 65.

One of the constituents of the mixture subjected to polymerizing conditions will be an acyclic terpene having three double bonds per molecule such as ocimene, allo-ocimene, myrcene and cryptotaenene. Allo-ocimene is the preferred acyclic terpene to employ inasmuch as in addition to having three double bonds per molecule it has them in a triply conjugated arrangement. For convenience, an acyclic terpene having three double bonds per molecule will be referred to hereinafter merely as an acyclic terpene. In place of acyclic terpenes or their synthetic mixtures, materials which are rich in acyclic terpenes may be desirably employed. For example, the pyrolysis of α-pinene at elevated temperatures yields terpene mixtures containing as much as 40% allo-ocimene. The heat isomerization of B-pinene yields terpene mixtures containing as much as 65 to 70% myrcene.

In accordance with the invention, the additional constituent of the mixture submitted to polymerizing conditions will be an acyclic unsaturated monobasic fatty acid having between 12 and 22 carbon atoms, or mono or polyhydric alcohol ester of such a fatty acid. Accordingly, any of the following fatty acids may be employed:

1. Acids of the oleic series having the general formula $C_nH_{2n}-2O_2$, such as, hypogaeic, physetoleic, palmitoleic, lycopodic, oleic, rapic, petroselinic, cheiranthic, doeglic, jecoleic, gadoleic, erucic, brassidic, isoerucic, etc.

2. Acids of the series having the general formula $C_nH_{2n}-4O_2$, such as, palmitolic, linoleic, millet oil, telfairic, eleomargaric, eleostearic, tariric, humoceric, eicosinic, etc.

3. Acids of the linolenic series having the general formula $C_nH_{2n}-6O_2$, such as, linolenic, jecoric, isolinolenic, etc.

4. Acids of the clupanodonic series having the general formula $C_nH_{2n}-8O_2$, such as isanic, clupanodonic, therapic, arachidonic, etc. The glyceryl esters of the aforesaid fatty acids may be neutral esters, i. e., those having no free hydroxyl groups such as triolein, trilinolein, etc.; they may be partial esters, i. e., those having free hydroxyl groups such as diolein, dilinolein, etc.; they may be symmetrical such as in triolein, trilinolein, etc.; or they may be unsymmetrical such as in dioleomonostearin, dilinoleostearin, etc. The commercially available, naturally-occurring mixtures of the glyceryl esters of the aforesaid fatty acids, also the fatty acids obtained therefrom, may be employed. Hence, linseed oil, hemp oil, poppyseed oil, China-wood oil, soya bean oil, perilla oil, cottonseed oil, corn oil, menhaden fish oil, oiticica oil, safflower oil, sun-flower seed oil, fish oil, dehydrated castor oil, rape seed oil, walnut oil, rubber seed oil, hop seed oil, etc., may be used. Monohydric alcohol esters, such as methyl, ethyl, butyl, cyclohexyl, benzyl, allyl, methallyl, bornyl, fenchyl, abietyl, hydroabietyl, oleyl, etc., of the unsaturated fatty acids may be employed. In addition, the polyhydric alcohol esters of the unsaturated fatty acids may also be used such as, glycol, diethylene glycol, decamethylene glycol, glycerol, pentaerythritol, dipentaerythritol and the like.

In accordance with the invention, resinous copolymers may be prepared by heating together an acyclic terpene and an acyclic unsaturated monobasic fatty acid of between 12 and 22 carbon atoms or an ester thereof, at an elevated temperature without the use of a polymerization or condensation catalyst. The practical temperature limits for the reaction are between about 150° C. and about 350° C., with the preferred temperature being between about 170° C. and about 280° C. The reaction period will generally vary between about 0.1 hour and about 24 hours. When temperatures above the boiling points of the acyclic terpenes are employed, the use of a closed system is employed. In addition, when high temperatures such as 270–350° C. are utilized, short reaction periods are in general sufficient. Desirably, the reaction mixture will be vigorously agitated throughout the reaction period.

Now in accordance with the preferred embodiments of the invention, a polymerization or condensation catalyst may be employed. As such, there may be employed the metal halides, such as boron trifluoride and its molecular complexes with ethers and acids, titanium chloride, ferric chloride, and the halides of metals whose hydroxides are amphoteric, as aluminum chloride, stannic chloride, zinc chloride, etc., and their complexes with inorganic salts such as NaCl; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; and activated clays, such as, fuller's earth, diatomaceous earth, alumina, bauxite, synthetic magnesium silicates, etc. For the acid catalysts, certain anhydrides, as phosphorus pentoxide, etc., may be equivalently employed. The activated clays will desirably be calcined at temperatures of, for example, from 100° C. to 500° C. prior to use.

When a catalyst is employed, the catalyst to reactant ratio will generally vary between about 0.01 and about 1.0, preferably between about 0.05 and about 0.5. The operable temperature will vary between about −20° C. and about 300° C., and the operable reaction period will vary between about 0.5 hour and about 48 hours or more, preferably between about 4 hours and about 24 hours. Preferably, where a metal halide or acid catalyst is employed, a temperature between about 0° C. and about 40° C. will be used. With an activated clay catalyst the preferred temperatures are between about 175° C. and about 250° C. The ratio of acyclic terpene to fatty acid or ester thereof may vary between about 0.1 and about 3.0, preferably between about 0.5 and about 1.5.

As solvents, any organic liquid which is inert to the reactants and catalysts may be employed. Aliphatic hydrocarbons, such as gasoline, petroleum naphtha, butane, pentane, etc.; aromatic hydrocarbons, such as, benzene, toluene, xylene, etc.; cyclic hydrocarbons, such as cyclohexane, decahydronaphthalene, etc.; esters, such as methyl acetate, ethyl acetate, propyl acetate, isopropyl acetate, n-butyl acetate, etc.; halogenated hydrocarbons, such as chloroform, ethylene dichloride, carbon tetrachloride, trichloroethylene, ethyl chloride, methylene chloride, dichloroethyl ether, etc., may be employed. When the catalyst aluminum chloride is used, a chlorinated solvent, as ethylene dichloride, etc., is preferred.

Following the reaction, the catalyst will be removed by any desired method, as water-washing, etc. Where the catalysts, stannic chloride and aluminum chloride, have been employed, it is preferred to wash the reaction mixture with cold or hot solutions of inorganic acids, as for example, hydrochloric acid, sulfuric acid, etc. Thereby, catalyst-copolymer complexes are more readily decomposed, and the reaction mixture may be thereafter water-washed. Traces of dispersed complexes of metal halide catalysts may be further removed by treating the reaction mixture with an adsorbent such as fuller's earth, Filter-Cel, activated carbon, etc. The solvent is then removed, preferably by distillation under reduced pressure.

The process of this invention is adaptable to be used as a continuous process for the heat copolymerization of acyclic terpenes with the esters of unsaturated fatty acids, particularly the polyhydric alcohol esters. For instance, suitable mixtures of unsaturated fatty esters and acyclic terpenes may be continuously passed through a heated tube, preferably in the temperature range of about 250° C. to about 325° C. In this manner, rapid heating to the desired temperatures and rapid cooling following the copolymerization can be achieved. This enables efficient control of the reaction.

The color of the final products may be improved by utilizing acyclic terpenes which have been distilled from caustic. Also, the use of an inert atmosphere, such as, $CO_2$, $N_2$, etc., during the reaction yields pale-colored products. Other refining agents which may be employed include the adsorbents hereinbefore mentioned, also selective solvents, such as, furfural, furfuryl alcohol, phenol, etc. If desired, the copolymer resins obtained in accordance with the processes described herein may be subjected to vacuum distillation to remove volatile copolymers, leaving copolymer residues having higher melting points than the initial copolymerization product.

The application of the aforesaid processes enable the production of copolymer resins which are generally highly viscous liquids. Their solubility characteristics are such that they may be dissolved in common solvents, such as gasoline, benzene, toluene, xylene, ethylene chloride, etc. They are only partially soluble in alcohol, acetone, and the like.

The copolymer resins prepared in accordance with this invention are of particular utility inasmuch as they contain carboxyl groups and ester groups which are polar. The presence of these groups makes their field of application very broad. Thus, those resins prepared from fatty acids may be esterified with mono- and polyhydric alcohols to provide resins which are useful in the preparation of protective coatings, adhesives, and in the field of textile impregnation. Thus, monohydric alcohol esters such as the methyl, ethyl, propyl, isopropyl, butyl, amyl, cyclohexyl, benzyl, alkyl, methalkyl, fenchyl, bornyl, abietyl, hydroabietyl, oleyl, etc., esters; polyhydric alcohol esters such as the ethylene glycol, diethylene glycol, triethylene glycol, glycerol, diglycerol, triglycerol, pentaerythritol, etc., esters may be so utilized. Salts of the acyclic terpene-fatty acid copolymers may be prepared. Some of these salts, as the cobalt, etc., salts may be employed as driers in protective coatings. Others of the salts such as those formed by the complete or partial neutralization of the acyclic terpene-fatty acid resins with, for example, calcium oxide, calcium acetate, zinc oxide, zinc acetate, etc., are useful as film-forming materials for use in protective coatings. The sodium and ammonium salts act as emulsifying agents. The acyclic terpene-fatty acid copolymers may also be used in the manufacture of soaps. Both acyclic terpene-fatty acid copolymers and the copolymers made from the glyceryl esters of a fatty acid may be hydrogenated or "Hyexed" in accordance with the methods of U. S. Patent 2,154,629, granted to E. R. Littmann.

The resinous copolymers may be used alone or in conjunction with other materials in the lamination of glass, paper, wood, textile materials, etc. They may also be used in the form of solutions or emulsions as impregnants for paper, textiles, wood, etc., to impart flexibility thereto.

This application forms a continuation-in-part of my application, Serial No. 418,323, entitled "Terpene resins."

What I claim and desire to protect by Letters Patent is:

1. A copolymer of an acyclic terpene having three double bonds per molecule and a material selected from the group consisting of the acyclic unsaturated monobasic fatty acids of between 12 and 22 carbon atoms and the mono and polyhydric alcohol esters thereof.

2. A copolymer of allo-ocimene and a material selected from the group consisting of the acyclic unsaturated monobasic fatty acids of between 12 and 22 carbon atoms and the mono and polyhydric alcohol esters thereof.

3. A copolymer of myrcene and a material selected from the group consisting of the acyclic unsaturated monobasic fatty acids of between 12 and 22 carbon atoms and the mono and polyhydric alcohol esters thereof.

4. A copolymer of allo-ocimene and linseed oil.

5. A copolymer of allo-ocimene and Chinawood oil.

6. A copolymer of myrcene and linseed oil.

7. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, at a temperature between about —20° C. and about 350° C.

8. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, at a temperature between about 150° C. and about 350° C.

9. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of a catalyst capable of polymerizing the mixture, at a temperature between about —20° C. and about 300° C.

10. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of a metal halide catalyst capable of polymerizing the mixture, at a temperature between about —20° C. and about 300° C.

11. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of a metal halide catalyst capable of polymerizing the mixture, at a temperature between about 0° C. and about 40° C.

12. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of an acid catalyst capable of polymerizing the mixture, at a temperature between about —20° C. and about 300° C.

13. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of an acid catalyst capable of polymerizing the mixture, at a temperature between about 0° C. and about 40° C.

14. The process which comprises copolymerizing a mixture of an acyclic terpene having three double bonds per molecule and a material selected from the group consisting of the acyclic unsaturated monobasic fatty acids of between 12 and 22 carbon atoms and the mono and polyhydric alcohol esters thereof, in the presence of an activated clay as a polymerization catalyst, at a temperature between about 175° C. and about 250° C.

15. The process which comprises copolymerizing a mixture of an acyclic terpene having three double bonds per molecule and a material selected from the group consisting of the acyclic unsaturated monobasic fatty acids of between 12 and 22 carbon atoms and the monohydric and polyhydric alcohol esters thereof, at a temperature between about —20° C. and about 350° C., until copolymerization is substantially complete, and treating the copolymerized material with a refining agent selected from the group consisting of absorbents and selective solvents.

16. The process which comprises copolymerizing a mixture of an acyclic terpene having three double bonds per molecule and a material selected from the group consisting of the acyclic unsaturated monobasic fatty acids of between 12 and 22 carbon atoms and the monohydric and polyhydric alcohol esters thereof, in the presence of a boron fluoride catalyst at a temperature between about 0° C. and about 40° C.

17. The process which comprises copolymerizing a mixture of an acyclic terpene having three double bonds per molecule and a material selected from the group consisting of the acyclic unsaturated monobasic fatty acids of between 12 and 22 carbon atoms and the monohydric and polyhydric alcohol esters thereof, in the presence of a phosphoric acid catalyst at a temperature between about 0° C. and about 40° C.

ALFRED L. RUMMELSBURG.